3,129,236
BIS(TRIHYDROCARBYL TIN OXY)
AROMATIC COMPOUNDS
Gustav Weissenberger, Zurich, Switzerland, assignor to Monsanto Chemical Company, St. Louis, Mo., a corporation of Delaware
No Drawing. Filed Jan. 2, 1962, Ser. No. 163,900
Claims priority, application Switzerland Dec. 31, 1960
9 Claims. (Cl. 260—429.7)

The present invention relates to new and useful organic tin compounds, a method of making these compounds, biological toxicant compositions and the use of these compounds as biological toxicants. These new compounds are of the general formula $$R-\underset{\underset{R''}{|}}{\overset{\overset{R'}{|}}{Sn}}-O-X-O-Y$$

In this formula R, R' and R'' signify identical or different aliphatic, araliphatic, cycloaliphatic, or aromatic hydrocarbon radicals, X is an aromatic, possibly halogen-containing hydrocarbon radical, or aromatic, possibly halogen-containing hydrocarbon radicals which are connected directly to one another or are connected by an aliphatic, araliphatic or cycloaliphatic hydrocarbon radical. The radicals attached to the tin atom as well as the radicals joining the phenols may be unsaturated. Y is a hydrogen atom, a metal atom, preferably alkali metal atom, or another tin group RR'R''Sn. The preferred new organotin compounds of the invention are those having not more than 18 carbon atoms in R, R' or R''; however, for some uses organotin compounds are preferred wherein R, R', or R'' have not more than 8 carbon atoms.

These organotin-bis-phenolates which have been unknown until now, can be obtained in different ways. In a generally preferred method of triorganotin oxide or a triorganotin hydroxide and a bis-phenol are heated together, thereby the water which is formed by the reaction is continuously removed from the reaction mixture, as by evaporation, possibly under reduced pressure, or in an azeotrope with a solvent such as, for example, benzene, toluene, xylene, cyclohexane, etc. However, water-binding agents may also be used for this purpose. The condensation occurs according to the equation:

RR'R''SnOSnR''R'R + HO—X—OH →
        RR'R''SnO—X—OSnR''R'R + H₂O or

2RR'R''SnOH + HO—X—OH →
        RR'R''SnO—X—OSnR''R'R + 2H₂O

In another method a triorganotin halide is reacted with a mono- or dialkali salt of a bis-phenol, or with a bis-phenol in the presence of an acid-binding agent, preferably in a solvent. The necessary alkali salts can be prepared by methods well known in the art using alkali metals or alkali metal hydrides. Tertiary organic bases such as, for example, triethylamine, pyridine, etc., are advantageously used as acid-binding agents. This reaction proceeds according to the scheme:

2RR'R''SnCl + NaO—X—ONa →
        RR'R''SnO—X—OSnR''R'R + 2NaCl

Still a further method resides in the reaction of a triorganotin alkoxylate with a bis-phenol, according to the equation:

2RR'R''SnOAlkyl + HO—X—OH →
        RR'R''SnO—X—OSnR''R'R + 2Alcohol

Lower (not more than 8 carbon atoms) organotin alkoxylates such as methoxylate, ethoxylate, etc., are preferably employed in this transesterification, and the alcohol split off, is distilled continuously from the reaction mixture which is heated conveniently at about 90–120° C. Known catalysts promoting the reaction may be present. Depending on the circumstances, it may be advantageous to pass nitrogen into the reaction mixture.

By using the proper stoichiometric ratio of bis-phenol to tin compound reactant only one of the two hydroxyl groups of the bis-phenol reacts with the tin compound. Such compounds are equally useful for the proposed utilization and they have a better solubility, especially when they are in the form of alkali salts. The alkali metal can originate from the reaction, if a dialkali salt of a bis-phenol is reacted with half the equimolar amount of a triorganotin chloride. However, in this manner is formed, as a rule, a mixture of unsubstituted, mono- and disubstituted bis-phenols or bis-phenol salts. In order to get uniform products, therefore, it is suitable to convert in the usual way, endproducts which have still a phenolic hydroxyl group, to the desired metal salts, especially alkali salts.

Hemi-esters of bis-phenols may also be obtained on transesterification of bis-triorganotin phenolates by the reaction of bis-phenol at higher temperatures, thereby, sometimes, it may be advantageous to work with catalysts and under exclusion of oxygen. This transesterification occurs according to the equation:

RR'R''SnO—X—OSnR''R'R + HO—X—OH →
        2RR'R''SnO—X—OH

Examples of triorganotin compounds which can be reacted with bis-phenols are trimethyltin oxide, triethyltin oxide, trivinyltin oxide, tri-n-propyltin oxide, tri-iso-propyltin oxide, tripropenyltin oxide, triethynyltin oxide, triallyltin oxide, tri-n-butyltin oxide, trioctyltin oxide, trilauryltin oxide, tristearyltin oxide, trioleyltin oxide, tribenzyltin oxide, tristyryltin oxide, tricinnamyltin oxide, triphenyltin oxide, tricyclopentyltin oxide, tricyclohexyltin oxide, tricyclohexenyltin oxide, tricyclohexadienyltin oxide, etc. In place of these, the corresponding halides or the salts of other acids, or, if available, even hydroxides can be used in the reaction. Of course, the three hydrocarbon radicals on the tin atom can also be different, i.e. be a combination of the enumerated radicals. However, the symmetrically substituted triorganotin oxides, chlorides, hydroxides and alkoxides are generally more easily obtained and are therefore, to be preferred.

All existing bis-phenols can be condensed, or reacted or transesterified with these triorganotin compounds to give novel products as defined at the beginning. Preferred bis-phenols are those having not more than 25 carbon atoms.

The phenolic hydroxyl groups may be arranged in the bis-phenols in para, ortho or meta position with respect to one another, or with respect to the ring-connecting hydrocarbon radicals. Moreover, the phenol radicals may be joined either directly, or through a carbon atom, or through a chain of carbon atoms.

Suitable bis-phenols are, for example, bis-hydroxyphenyl, dihydroxybenzenes, naphthalene diols, anthracene diols, bis-(hydroxyphenyl)-methanes, -ethanes, -propanes, -butanes, -octanes, -cyclopentanes, -cyclohexanes, -phenylmethanes, -diphenylmethanes, etc.

The aliphatic, araliphatic or cycloaliphatic radicals linking the two phenols can likewise be unsaturated, as in dihydroxystilbenes, bis-(hydroxyphenyl)-propenes, -styrenes, -cyclohexenes, etc.

The corresponding compounds which contain halogenated bis-phenols were found to be particularly effective. A halogenated bis-phenol is understood here to be a bis-phenol which contains in the aromatic ring at least one halogen atom, preferably chlorine atom. As a rule, the benzene rings show 1–4 chlorine atoms which may be arranged in the optional possible manner with regard to the phenolic hydroxyl groups. Compounds derived from 2,2′-dihydroxy-5,5′ - dichlorodiphenylmethane or 2,2′-dihydroxy - 3,5,6,3′,5′,6′, - hexachlorodiphenylmethane and corresponding to the formulae

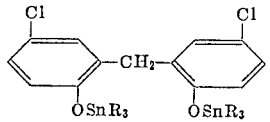

or

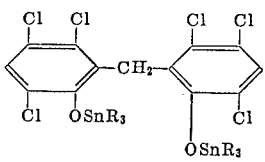

have been found to be particularly active.

The novel compounds serve as bactericide, fungicide, plant protecting agent, herbicides, insecticides, etc. For these purposes, they can be converted to emulsions or mixed with fillers in conventional manner.

EXAMPLE 1

7.44 g. of tetrachlorohydroquinone (0.03 mol) are converted with sodium hydride in 100 ml. of tetrahydrofuran to the sodium salt. To this suspension is added dropwise a solution of 14.48 g. of triethyltin chloride (0.06 mol) in a small amount of tetrahydrofuran and refluxed for 3 hours with stirring. The precipitated sodium chloride is filtered off and the tetrahydrofuran distilled off in vacuum. The substance can be purified by recrystallization from light petroleum, M.P. 114–116° C.

Analysis:

| Percent | Calc'd | Found |
|---|---|---|
| C | 32.8 | 32.86 |
| H | 4.6 | 4.56 |
| Sn | 36.1 | 36.00 |
| Cl | 21.57 | 21.59 |

EXAMPLE 2

35.7 g. of tributyltin oxide (0.06 mol) and 14.9 g. of tetrachlorohydroquinone (0.06 mol) are refluxed in 230 ml. of benzene and the water formed in the reaction is azeotropically distilled off from the reaction mixture. The reaction is complete after 2 hours. After the benzene has been distilled off a clear liquid product remains, having a refractive index of $n_D^{20}$ 1.5414.

Analysis:

| Percent | Calc'd | Found |
|---|---|---|
| C | 43.6 | 43.67 |
| H | 6.54 | 6.65 |
| Cl | 17.18 | 17.00 |
| Sn | 28.70 | 28.30 |

EXAMPLE 3

By the same process as in Example 2, using 17.9 g. of tributyltin oxide (0.03 mol) and 12.2 g. of 2,2′-dihydroxy - 3,5,6,3′,5′,6′ - hexachlorodiphenylmethane, a clear liquid condensation product is obtained quantitatively, having a refractive index of $n_D^{20}$ 1.5638. The amount of water released corresponds to the theory.

Analysis:

| Percent | Calc'd | Found |
|---|---|---|
| C | 45.12 | 45.4 |
| H | 5.24 | 5.75 |
| Sn | 24.2 | 24.2 |

EXAMPLE 4

By the same process as in Example 2, using 17.9 g. of tributyltin oxide (0.03 mol) and 8.1 g. of 2,2′-dihydroxy-5,5′-dichlorodiphenylmethane (0.03 mol) in 150 ml. of toluene, a clear liquid condensation product is obtained quantitatively showing a refractive index of $n_D^{20}$ 1.5430. The amount of water which is split off corresponds to the theory.

EXAMPLE 5

18.3 g. of triphenyltinhydroxide (0.05 mol) and 6.2 g. of tetrachlorohydroquinone (0.025 mol) are refluxed in 125 ml. of benzene or toluene. The water formed in azeotropically distilled off from the reaction mixture. The reaction is complete after 1½–2 hours and the product formed precipitates partly during the condensation. The desired product remains quantitatively upon distillation of the solvent. The substance can be purified by recrystallization from toluene; M.P. 215–216° C.

Analysis: Percent Sn calc'd. 25.1. Percent Sn found 24.8.

EXAMPLE 6

In this example the pre-emergent herbicidal ratings of some of the organotin compounds of this invention were determined in greenhouse tests in which a specific number of seeds of 12 different plants, each representing a principal botanical type, were planted in greenhouse flats. A good grade of top soil was placed in either 9½″ x 5¾″ x 2¾″ or 9″ x 13″ x 2″ aluminum pans and compacted to a depth or ⅜ inch from the top of the pan. On top of the soil were placed five seeds of each of radish, morning glory, and tomato; 10 seeds of each of sugar beet, sorghum, and brome grass; 20 seeds of each of wild buckwheat, giant foxtail, rye grass, wild oat; approximately 20 to 30 (a volume measure) of each of pigweed and crab grass; and either 2 or 3 seeds of soybean. The seeds were araranged with three soybean seeds across the center of the large aluminum pan, the monocotyledon or grass seeds scattered randomly over the remaining one-third of the soil surface, and the dicotyledon or broadleaf seeds scattered randomly over the remaining one-third of the soil surface at the other end of the pan. The seeds were then covered with ⅜ inch of prepared soil mixture and the pan leveled. The herbicidal composition was applied to the plantings prior to the watering of the seeds. This application of the herbicidal composition was made by spraying the surface of the soil with an acetone solution containing a sufficient quantity of the candidate chemical to obtain the desired rate per acre on the soil surface. The watering of the seeds was accomplished by placing the aluminum pans in a sand bench having one-half inch depth of water thereon and permitting the soil in the pans to absorb moisture through the perforated bottom of the pans.

The planted pans were thereafter placed on a wet sand bench in a greenhouse and maintained there for 14 days under ordinary conditions of sunlight and watering. At the end of this time, the plants were observed and the results recorded by counting the number of plants of each species which germinated and grew. The herbicidal rating was obtained by means of a fixed scale based on the average percent germination of each seed lot. The herbicidal ratings are defined as follows:

0—No phytotoxicity
1—Slight phytotoxicity
2—Moderate phytotoxicity
3—Severe phytotoxicity The pre-emergent herbicidal activity of some of the organotin compounds of this invention are recorded in Table 1 for various application rates of the organotin compounds. In Table 1, the various seeds are represented by letters as follows:

A—General grass
B—General broadleaf
C—Morning glory
D—Wild oats
E—Brome grass
F—Rye grass
G—Radish
H—Sugar beet
I—Foxtail
J—Crab grass
K—Pigweed
L—Soybean
M—Wild buckwheat
N—Tomato
O—Sorghum

*Table 1*

| Compound | | Plant Type | | | | | | | | | | | | |
|---|---|---|---|---|---|---|---|---|---|---|---|---|---|---|
| The Product of— | Rate, Lbs./Acre | C | D | E | F | G | H | I | J | K | L | M | N | O |
| Example 1 | 5 | 3 | 2 | 3 | 3 | 3 | 3 | 3 | 3 | 3 | 0 | 3 | 3 | 3 |
|  | 1 | 0 | 0 | 0 | 0 | 0 | 1 | 1 | 1 | 0 | 3 | 0 | 0 | 0 |
|  | 0.5 | 0 | 0 | 0 | 0 | 0 | 0 | 0 | 0 | 0 | 0 | 0 | 0 | 0 |
| Example 2 | 5 | 0 | 1 | 2 | 0 | 3 | 2 | 2 | 3 | 3 | 0 | 0 | 3 | 1 |
|  | 1 | 0 | 0 | 0 | 0 | 0 | 0 | 0 | 0 | 0 | 0 | 0 | 0 | 0 |
| Example 4 | 5 | 2 | 2 | 2 | 2 | 3 | 3 | 3 | 2 | 3 | 0 | 1 | 3 | 0 |
|  | 1 | 0 | 0 | 0 | 0 | 0 | 1 | 0 | 1 | 0 | 0 | 0 | 0 | 0 |
|  | 0.5 | 0 | 0 | 0 | 0 | 0 | 0 | 0 | 0 | 0 | 0 | 0 | 0 | 0 |

The data in Table 1 illustrates the general herbicidal activity as well as the selective herbicidal activity of some of the organotin compounds of the invention. Thus these organotin compounds are particularly useful in soil sterilization applications.

EXAMPLE 7

In this example, the contact herbicidal activity of some of the organotin compounds of this invention was determined in greenhouse tests. The organotin compounds to be tested was applied in spray form to 21-day old specimens of the same grasses and broadleaf plants as used in the pre-emergent tests described in Example 6. The same number of seeds of the same plants used in Example 6 were planted in the 9½" x 5¾" x 2¾" aluminum pans arranged in the same manner with a soybean seed in diagonal corners as described in Example 6. After the plants were 21-days old, each aluminum pan was sprayed with 6 ml. of a 0.5% concentration solution of the candidate chemical, corresponding to a rate of approximately 9 lbs. per acre. This herbicidal solution was prepared from 1.5 ml. of a 2% solution of the candidate compound in acetone, 0.2 ml. of a 3:1 cyclohexanone-emulsifying agent mix, and sufficient water to make a volume of 6 ml. The emulsifying agent was a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants were then observed 14 days later and are reported in Table 2. The herbicidal ratings recorded in Table 2 have the same meaning as stated in Example 6.

The herbicidal compositions of this invention are either particulate solid (i.e., dusts) or liquid concentrate compo-

*Table 2*

| Compound | | Plant Type | | | | | | | | | | | | | | |
|---|---|---|---|---|---|---|---|---|---|---|---|---|---|---|---|---|
| The Product of— | Conc., Wt. | A | B | C | D | E | F | G | H | I | J | K | L | M | N | O |
| Example 1 | 0.2 | 1 | 4 | 3 | 1 | 1 | 1 | 4 | 4 | 2 | 2 | 4 | 4 | 4 | 4 | 1 |
|  | 0.05 | 0 | 2 | 0 | 0 | 0 | 0 | 4 | 0 | 0 | 4 | 0 | 4 | 0 | 0 | 0 |
|  | 0.01 | 0 | 0 | 0 | 0 | 0 | 0 | 0 | 0 | 0 | 0 | 0 | 0 | 0 | 0 | 0 |
| Example 2 | 0.2 | 0 | 4 | 3 | 1 | 0 | 0 | 4 | 4 | 1 | 1 | 4 | 4 | 4 | 4 | 0 |
|  | 0.05 | 0 | 4 | 0 | 0 | 0 | 0 | 4 | 3 | 0 | 0 | 0 | 0 | 0 | 0 | 0 |
|  | 0.01 | 0 | 1 | 0 | 0 | 0 | 0 | 0 | 0 | 0 | 0 | 0 | 0 | 0 | 0 | 0 |
| Example 3 | 0.2 | 1 | 3 | 2 | 1 | 1 | 0 | 4 | 1 | 1 | 1 | 4 | 2 | 3 | 4 | 2 |
|  | 0.05 | 1 | 1 |  |  |  |  |  |  |  |  |  |  |  |  |  |
| Example 4 | 0.5 | 2 | 4 | 2 | 1 | 1 | 0 | 4 | 1 | 2 | 2 | 4 | 4 | 3 | 4 | 3 |
|  | 0.2 | 0 | 2B | 0 | 1 | 1 | 0 | 4 | 0 | 1 | 1 | 4 | 2 | 0 | 4 | 0 |
|  | 0.05 | 0 | 1B | 0 | 0 | 0 | 0 | 3 | 0 | 0 | 0 | 0 | 1 | 2 | 0 | 0 |

B=26–50% defoliation.

sitions comprising the active ingredient and either a particulate solid or liquid herbicidal adjuvant which are formulation aids or conditioning agents permitting the concentrate composition to be readily mixed with a suitable solid or liquid carrier in the field for application of the active ingredient on soil or plant surfaces in a toxic concentration in a form which enables prompt assimilation by the germinating seeds, emerging seedlings, or full grown plants. Thus, the herbicidal compositions of this invention include not only the concentrate compositions comprising the active ingredient and the herbicidal adjuvant but also herbicidal toxicant compositions applied in the field comprising the concentrate composition (i.e., active ingredient plus herbicidal adjuvant) and the carrier.

As demonstrated in the examples above, quite different effects can be obtained by modifying the method of use of the herbicidal composition of this invention. Thus, unusual specificity can be achieved at lower levels of application whereas at higher levels of application a more general herbicidal effect or soil sterilization takes place. Therefore, an essential part of this invention is the formulation of the herbicidal composition so as to permit a uniform predetermined application of the composition to the plant environment to produce the desired effect.

Herbicidal adjuvants useful in preparing the concentrate compositions and, therefore, the herbicidal toxicant compositions applied to the soil or plants, include particulate solid or liquid extending agents such as solvents or diluents within which the active ingredient is dissolved or suspended, wetting or emulsifying agents which serve in providing uniform dispersions or solutions of the active ingredient in the extending agents, and adhesive agents or spreading agents which improve the contact of the active ingredient with the soil or plant surfaces. All herbicidal compositions of this invention include at least one of the above types of herbicidal adjuvants and usually include an extending agent and a wetting or emulsifying agent.

The active ingredient need not be dissolved in the extending agent but may merely be dispersed or suspended in the extending agent as a suspension or emulsion. Also, the organotin compounds may first be dissolved in a suitable organic solvent and the organic solution of the active ingredient then incorporated in water or an aqueous extending agent to form a heterogeneous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like.

Solid extending agents in the form of particulate solids are very useful in the practice of the present invention. In using this type of extending agent, the active ingredient is either adsorbed or dispersed on or in the finely-divided solid material. Preferably the solid extending agents are not hygroscopic but are materials which render the composition permanently dry and free flowing. Suitable solid extending agents include the natural clays, such as china clays, the bentonites and the attapulgites; other minerals in natural state, such as talc, pyrophyillite, quartz, diatomaceous earth, fuller's earth, chalk, rock phosphate, kaolin, kieselguhr, volanic ash, salt and sulfur; the chemically modified minerals, such as acid-washed bentonite, precipitated calcium phosphate, precipitated calcium carbonate, calcined magnesia, and colloidal silica; and other solid materials such as powdered cork, powdered wood, and powdered pecan or walnut shells. These materials are used in finely-divided form, at least in a size range of 20-40 mesh and preferably in much finer size.

The particulate solid concentrate compositions are applied to the soil by admixture at the time of application with a particulate solid carrier material. If desired, this concentrate composition can also be applied as a wettable powder using a liquid carrier material. When used by this method, a wetting agent or surface active agent is added to the concentrate composition in order to render the particulate solid extending agent wettable by water to obtain a stable aqueous dispersion or suspension suitable for use as a spray. Also, the extending agent applied as a wettable powder is used in very finely-divided form, preferably in a size as small as 100 mesh or smaller.

The surface active agent, that is the wetting, emulsifying, or dispersion agent, used in the herbicidal composition of this invention to serve in providing uniform dispersions of all formulation components of both liquid and dust types in both the concentrate compositions and the toxicant compositions applied, may be either anionic, cationic, or non-ionic types, including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils; quaternary salts of high molecular weight acids; rosin soaps, such as salts of abietic acid; sulfuric acid salts of high molecular weight organic compounds; algin soaps; ethylene oxide condensated with fatty acids, alkyl phenols and mercaptans; and other simple and polymeric compositions having both hydrophilic and hydrophobic functions.

The herbicidal concentrate compositions of this invention ordinarily have the active ingredient and the surface active agent present in higher concentrations than the toxicant compositions applied in the field so that upon dilution with the liquid or solid carrier, compositions containing optimum proportions of active ingredient and surface active agent are prepared to obtain uniform distribution and to maintain the active ingredient in a form which enables the prompt assimilation by the plant.

The liquid concentrate compositions of this invention preferably comprise 5% to 95% by weight of the active ingredient and the remainder the herbicidal adjuvant, which may be solely liquid extending agent or surface active agent (including adhesive agent), but preferably is a combination of liquid extending agent and surface active agent. Preferably, the surface active agent comprises from 0.1% to 15% by weight of the total concentrate composition. The remainder of the composition is the liquid extending agent.

Use of the surface active agent is necessary in the formulation of liquid concentrate compositions in order to obtain a composition containing a sufficient concentration of the difficultly soluble organotin compounds in the liquid extending agent. However, the liquid extending agent must be selected not only on the basis of the amount of the organotin compound dissolved but also upon the basis of the solution temperature of the total composition. Thus, in some formulations, a particular combination of solvents give a sufficiently low solvent temperature but the amount of the organotin compound dissolved or dispersed in the mixture is insufficient and a suitable surface active agent must be selected in order that more organotin compound can be dispersed in the composition. Preferably, the concentrate composition has a solution temperature below 0° C. although compositions having solution temperatures as high as 20° C. can be used.

The concentration of organotin compound in the particulate solid or dust concentrate composition of this invention may vary over wide ranges depending upon the nature of the solid extending agent and the intended use of the composition. Applied at very low rates in order to obtain selectivity, the concentration of the active ingredient in the dust composition may be very low and may comprise as little as 1% or less by wt. of the total dust composition. By contrast, when the dust composition is to be used for soil sterilization, it may be desirable to have a very high concentration of active ingredient and for such use the active ingredient may comprise as much as 5% to 98% by wt. of the total composition. The remainder of the composition is the herbicidal adjuvant which is usually only the particulate solid extending agent. Thus, the surface active agent is not usually required in dust concentrate compositions although it can be used if desired. However, if the dust concentrate composition is to be applied as a wettable powder, surface active agent must be added to the concentrate composition and ordinarily the amount of surface active agent will be in the range of 0.1% to 15% by wt. of the composition.

The carrier material, used for the uniform distribution of the organotin compound in a herbicidally effective amount to inhibit the growth of either all or selected plants, may be either a liquid or a particulate solid material. The liquid and solid extending agents used to prepare the concentrate composition may also be used as the carrier; however, the use of these materials as a carrier is often not economical. Therefore, water is the preferred liquid carrier, both for use with the liquid concentrate composition and the wettable powder concentrate. Suitable particulate solid carriers include the particulate extending agents noted above as well as the solid fertilizers such as ammonium nitrate, urea, and superphosphate, as well as other materials in which plant organisms may take root and grow, such as compost, manure, humus, sand and the like.

The liquid and dust concentrate compositions of this invention can also contain other additaments such as fertilizer and pesticides. Also, these additaments may be used as, or in combination with, the carrier materials.

The herbicidal compositions of this invention are applied to the plant systems in the conventional manner. Thus, the dust and liquid compositions may be applied to the foliage of growing plants by the use of power-dusters, broom and hand sprayers, and spray-dusters. The compositions can also be very suitably applied from airplanes as a dust or a spray because the herbicidal compositions of this invention are effective in very low dosages. In order to prevent growth of germinating seeds or emerging seedlings, the dust and liquid compositions are applied to the soil according to conventional methods, and, preferably, distributed in the soil to a depth of at least ½ inch below the soil surface. It is not absolutely necessary that the herbicidal compositions be admixed with the soil particles and these compositions can be applied merely by spraying or sprinkling onto the surface of the soil. The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by the usual discing, dragging, or mixing operations.

The application of a growth-inhibiting amount or toxic amount of the organotin compound to the plant system is essential in the practice of the present invention. The exact dosage to be applied is dependent not only upon the specific organotin compound but also upon the particular plant species to be controlled and the stage of growth thereof as well as the part of the plant to be contacted with the toxicant. In non-selective foliage treatments, the herbicidal compositions of this invention are usually applied at a rate sufficient to obtain from 5 to 50 lbs. of organotin compound per acre but lower or higher rates might be applied in some cases. In non-selective pre-emergent treatments, these herbicidal compositions are usually applied at a somewhat lower rate than in foliage treatments but at a rate which is ordinarily within the same general range; that is, at a rate in the range of 1 to 25 lbs. per acre. In selective pre-emergent applications to the soil, a dosage of from 0.5 to 5 lbs. of active ingredient per acre is usually employed but lower or higher rates may be necessary in some instances. It is believed that one skilled in the art can readily determine from this disclosure, including the examples, the optimum rate to be applied in any particular case.

The essential active ingredient of the herbicidal compositions of this invention is the organotin compound disclosed in this specification. Of course, one skilled in the art will understand that mixtures of various organotin compounds can also be used.

EXAMPLE 8

For evaluation of the bacteriostatic and fungistatic effects of these new compounds, several of these compounds were tested. These compounds were mixed in predetermined concentrations with hot sterile agar which was subsequently poured into Petri dishes, cooled, and allowed to harden. Nutrient agar containing the test compounds was then inoculated with the bacteria *Staphylococcus aureus* and *Salmonella typhosa* and incubated for two days at 37° C.; and Sabouraud's dextrose agar containing the test compounds was inoculated with the fungus organism *Aspergillus niger*, and incubated for five days at 27° C. The results of these tests are reported in Table 3.

Table 3

| Compound | *Staphylococcus aureus*, p.p.m. | | | | *Salmonella typhosa*, p.p.m. | | | | *Aspergillus niger*, p.p.m. | | | |
|---|---|---|---|---|---|---|---|---|---|---|---|---|
| | $10^3$ | $10^2$ | 10 | 1 | $10^3$ | $10^2$ | 10 | 1 | $10^3$ | $10^2$ | 10 | 1 |
| The Product of— | | | | | | | | | | | | |
| Example 2 | a | a | a | a | a | i | i | i | a | a | a | a |
| Example 3 | a | a | a | a | a | i | i | i | a | a | a | i |
| Example 4 | a | a | a | a | i | i | i | i | a | a | a | a | a=active; i=inactive.

It is noted from an examination of the data in Table 3 that the organotin compounds of the invention are very active bacteriostats and fungistats; that concentrations in some cases were as low as one part per million of the test compounds. Usually these novel compounds will be applied as bacteriostats or fungistats at concentrations in the range of 0.0001% to 1.0%, preferably 0.001% to 0.1%, suspended, dispersed or dissolved in inert carriers.

The new compounds of this invention may be applied to microorganisms (bacteria and fungi), the growth of which it is wished to inhibit, or they may be compounded in emulsions or in other forms in a similar manner as described for compounding the organotin compounds as herbicides.

What is claimed is:
1. An organotin compound of the formula

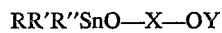

RR'R''SnO—X—OY wherein R, R' and R'' are hydrocarbon radicals having not more than 18 carbon atoms, X is selected from the class consisting of aromatic hydrocarbon radicals and aromatic ring halogenated derivatives of these radicals having not more than 25 carbon atoms, and Y is a RR'R''Sn group wherein R, R' and R'' are as defined hereinabove.

2. An organotin compound of the formula

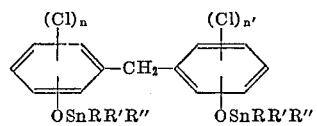

wherein R, R' and R'' are alkyl radicals having not more than 8 carbon atoms, and $n$ and $n'$ are integers from 0 to 4 inclusive.

3. An organotin compound of the formula

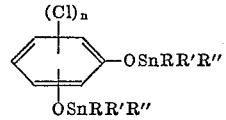

wherein R, R' and R'' are alkyl radicals having not more than 8 carbon atoms, and $n$ is an integer from 0 to 4 inclusive.

4. An organotin compound of the formula

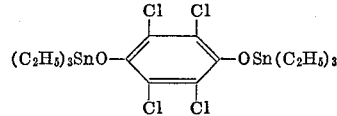

5. An organotin compound of the formula

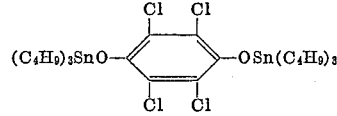

6. An organotin compound of the formula

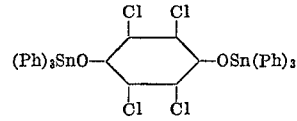

wherein Ph is the phenyl radical.

7. An organotin compound of the formula

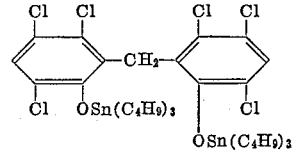

8. An organotin compound of the formula
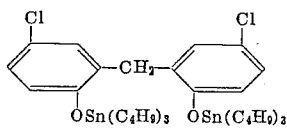
9. A compound of the formula
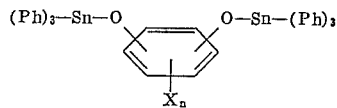
wherein Ph is phenyl, X is a halogen, and $n$ is a number from 0 to 4.
References Cited in the file of this patent
UNITED STATES PATENTS
| | | |
|---|---|---|
| 2,864,737 | Fields et al. | Dec. 16, 1958 |
| 2,873,288 | Rosenberg et al. | Feb. 10, 1959 |
| 2,878,155 | Cruickshank | Mar. 17, 1959 |
| 2,892,856 | Ramsden et al. | June 30, 1959 |
| 3,004,843 | Josephs | Oct. 17, 1961 |
| 3,006,749 | Farmer et al. | Oct. 31, 1961 |
OTHER REFERENCES
"Chemical Reviews," October 1960, pages 494, 495, and 497.